United States Patent
Liu et al.

(10) Patent No.: US 8,638,275 B2
(45) Date of Patent: *Jan. 28, 2014

(54) INCANDESCENT LIGHT SOURCE DISPLAY AND METHOD FOR MAKING THE SAME

(75) Inventors: Peng Liu, Beijing (CN); Liang Liu, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 1072 days.

This patent is subject to a terminal disclaimer.

(21) Appl. No.: 12/590,755

(22) Filed: Nov. 13, 2009

(65) Prior Publication Data

US 2010/0245215 A1    Sep. 30, 2010

(30) Foreign Application Priority Data

Mar. 27, 2009 (CN) .......................... 2009 1 0106402

(51) Int. Cl.
*G09G 3/24* (2006.01)
*H01K 1/00* (2006.01)

(52) U.S. Cl.
USPC ............... 345/73; 345/49; 345/105; 345/106; 345/204; 313/495; 359/288; 359/277; 977/742; 977/762; 977/949; 977/952

(58) Field of Classification Search
USPC ............. 345/73, 49, 105, 106, 204; 313/309, 313/311, 495–498; 445/50–51; 359/242, 359/265–277, 288; 977/742, 762, 949, 952
See application file for complete search history.

(56) References Cited

U.S. PATENT DOCUMENTS

| | | | |
|---|---|---|---|
| 5,956,003 A | 9/1999 | Fisher | |
| 6,011,567 A * | 1/2000 | Nakamura et al. | 347/115 |
| 7,933,058 B2 * | 4/2011 | Liu et al. | 359/288 |
| 8,289,611 B2 * | 10/2012 | Liu et al. | 359/288 |

(Continued)

FOREIGN PATENT DOCUMENTS

| | | |
|---|---|---|
| CN | 1945783 | 4/2007 |
| JP | 01-112557 | 5/1989 |
| JP | 01-235992 | 9/1989 |
| JP | 2004-111345 | 4/2004 |
| JP | 2008-523254 | 7/2008 |

OTHER PUBLICATIONS

Jiang Kai-Li et al. "Continuous carbon nanotube yarns and their applications" Physics, 2003, vol. 32, No. 8, p. 506-510, The last paragraph of left column of p. 509 to Paragraph 1 of right column of p. 509 may be relevant.

*Primary Examiner* — Lun-Yi Lao
*Assistant Examiner* — Md Saiful A Siddiqui
(74) *Attorney, Agent, or Firm* — Altis Law Group, Inc.

(57) ABSTRACT

An incandescent light source display includes a substrate, a plurality of first electrode down-leads, a plurality of second electrode down-leads and a plurality of heating units. The plurality of first electrode down-leads are located on the substrate in parallel to each other and the plurality of second electrode down-leads are located on the substrate in parallel to each other. The first electrode down-leads cross the second electrode down-leads and corporately define a grid having a plurality of cells. Each of the incandescent light sources is located in correspondence with each of the cells. Each incandescent light source includes a first electrode, a second electrode and an incandescent element. The incandescent element includes a carbon nanotube structure.

18 Claims, 9 Drawing Sheets

(56) References Cited

U.S. PATENT DOCUMENTS

| | | |
|---|---|---|
| 2004/0051432 A1 | 3/2004 | Jiang et al. |
| 2006/0061257 A1* | 3/2006 | Nakamoto ............... 313/496 |
| 2007/0190672 A1* | 8/2007 | Kitamura et al. ........... 438/20 |
| 2008/0170982 A1* | 7/2008 | Zhang et al. ............ 423/447.3 |
| 2008/0297878 A1* | 12/2008 | Brown et al. ............... 359/263 |
| 2009/0001867 A1* | 1/2009 | Yang et al. ................. 313/496 |
| 2010/0164343 A1 | 7/2010 | Choi et al. |

* cited by examiner

INCANDESCENT LIGHT SOURCE DISPLAY AND METHOD FOR MAKING THE SAME

CROSS-REFERENCE TO RELATED APPLICATIONS

This application claims all benefits accruing under 35 U.S.C. §119 from China Patent Application No. 200910106402.9, filed on Mar. 27, 2009 in the China Intellectual Property Office.

BACKGROUND

1. Technical Field

The present disclosure relates to display and method for making the same and, particularly, to an incandescent light source display and method for making the same.

2. Description of Related Art

In order to display dynamic images, more than 24 frames should be displayed within 1 minute. Therefore, the response time of pixels in a display should be less than 41 ms (milliseconds). Usually, the response time of pixels in a liquid crystal display (LCD) can be less than 25 ms, even as little as 5 ms. The response time of pixels in a cathode ray tube (CRT) display can be just several microseconds.

Various notable scientists and engineers have struggled to determine what solid material makes the best light source. In 1800, Humphry Davy invented the first electric light but it had a very short lifespan. Much later, physicist Joseph Swan developed a longer-lasting electric light with a carbon paper filament. Unfortunately, Swan's design also had a short lifespan. In 1879, Thomas Edison developed a filament made of carbon black coated over a piece of string. His early design lasted 40 hours in an oxygen-free bulb. Lewis Latimer, a member of Edison's research team, later patented a method for manufacturing carbon filaments in 1881. Carbon-coated filaments, however, were ultimately found to be inadequate because of their low reliability and low operating temperature. In 1910, William Coolidge used tungsten filaments. Tungsten filaments were found to have a longer lifespan than Edison's carbon-coated filaments and became widely applied in incandescent light sources.

Incandescent light sources are bright and efficient can be advantageous for use in displays. However, until now, the response time of the tungsten filament has been too long to be used in displays. For example, the response time of a tungsten filament with a diameter of 15 μm (micrometers) is about 100 ms.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

References will now be made to the drawings to describe, in detail, embodiments of the present incandescent light source display.

Figure 1:
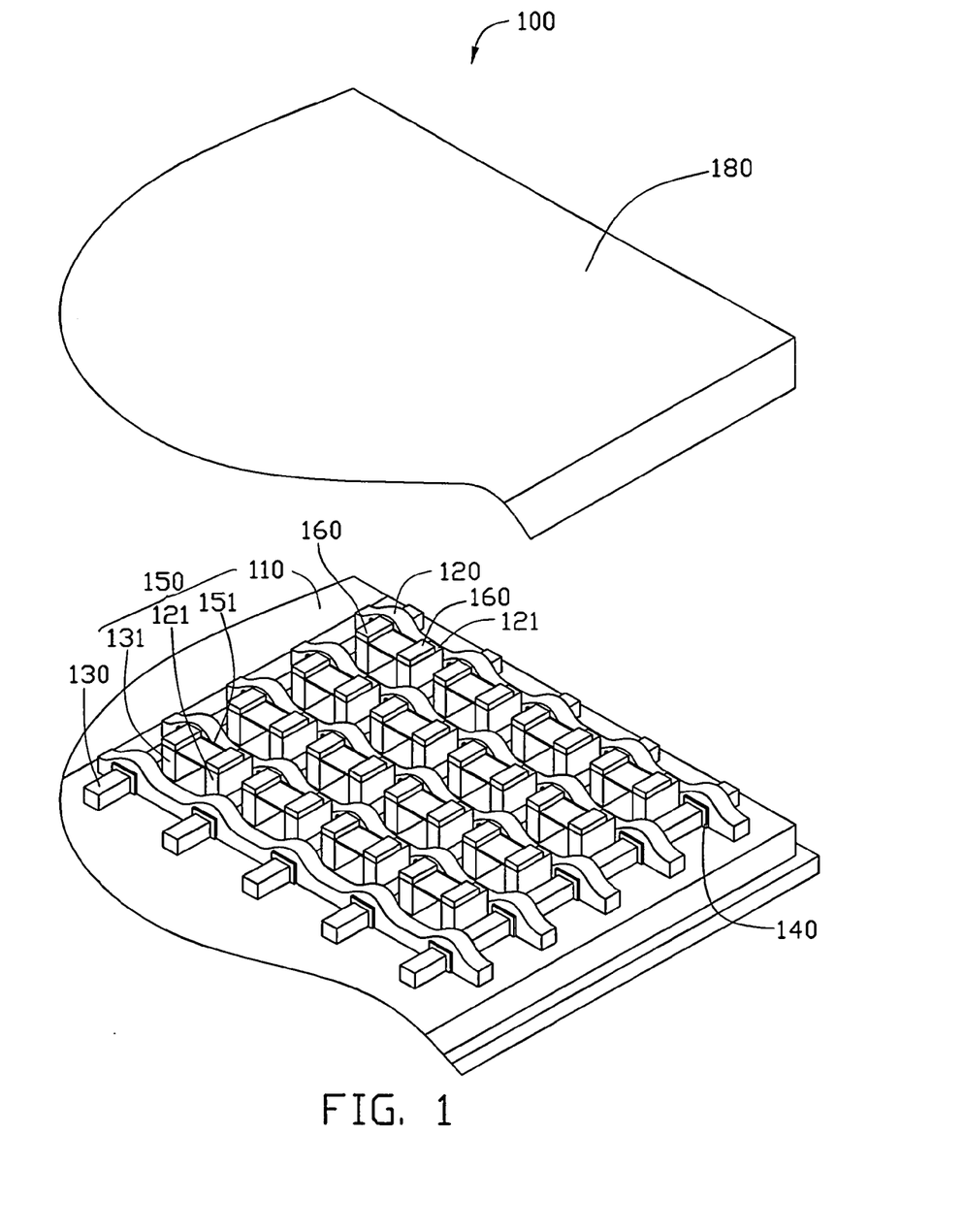
FIG. 1 is an isotropic view of an incandescent light source display according to one embodiment.
Figure 2:
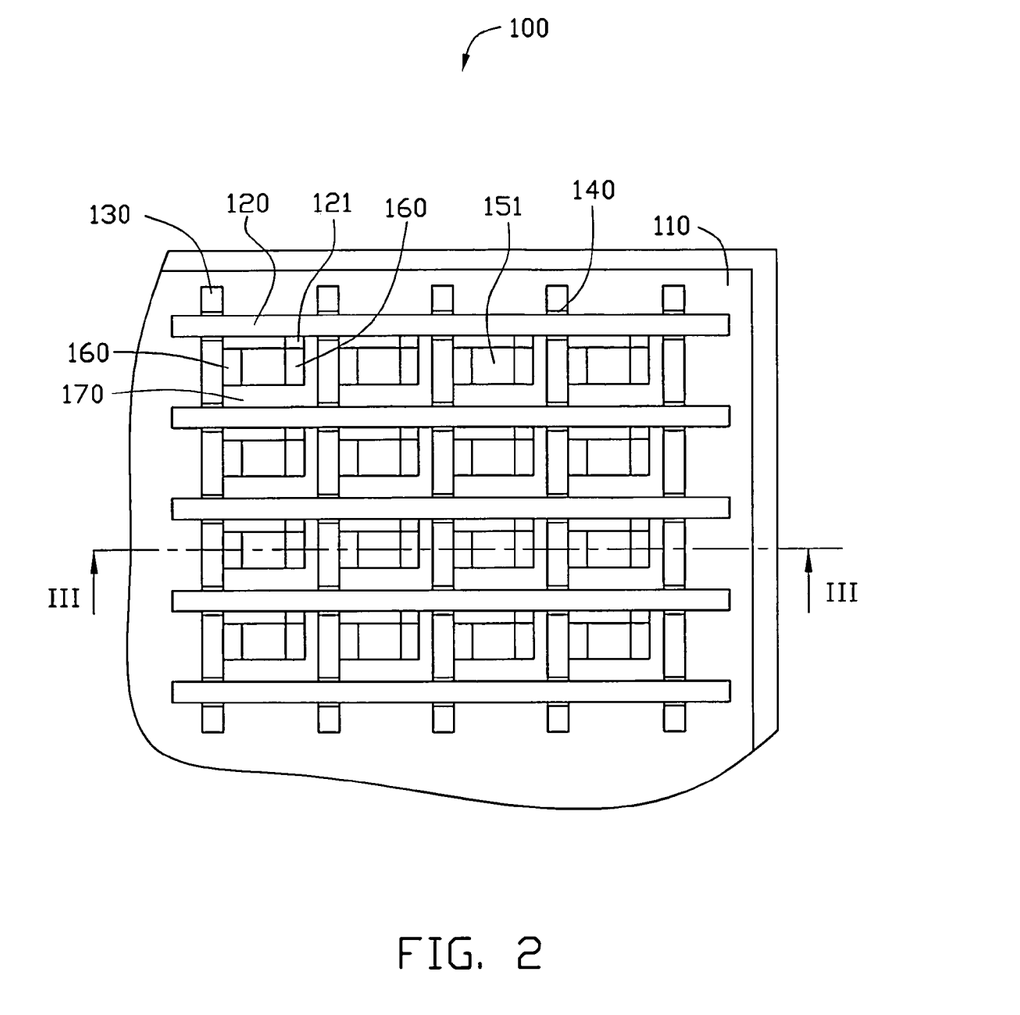
FIG. 2 is a top view of the incandescent light source display of FIG. 1.
Figure 3:
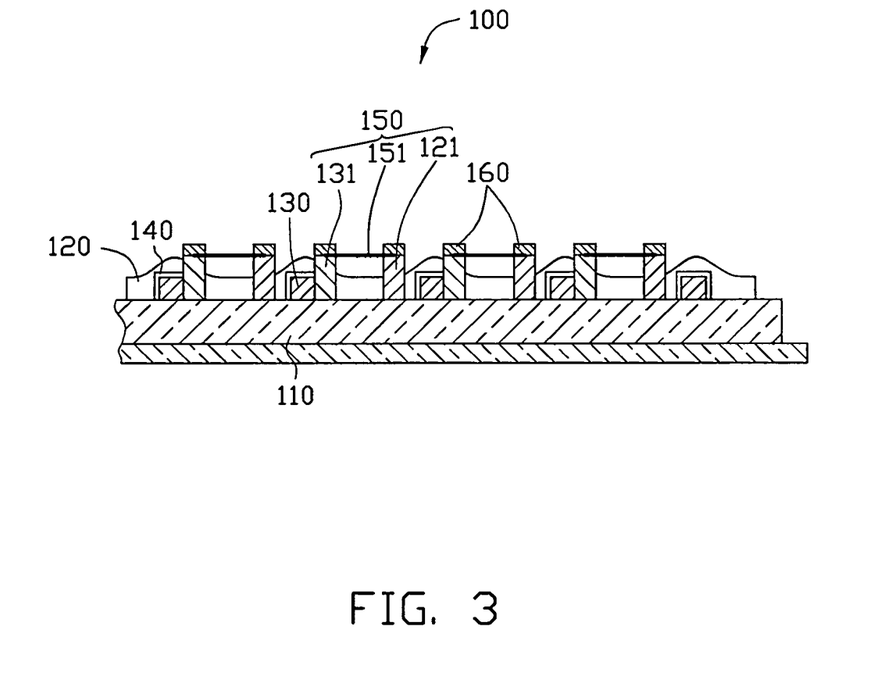
FIG. 3 is a schematic, cross-sectional view, along a line of FIG. 2.

Referring to FIGS. 1, 2 and 3, an incandescent light source display 100 according to one embodiment is shown. The incandescent light source display 100 includes a substrate 110, a plurality of parallel first electrode down-leads 120, a plurality of parallel second electrode down-leads 130, and a plurality of incandescent light sources 150. The pluralities of first and second electrode down-leads 120, 130 are located on the substrate 110. The first electrode down-leads 120 are generally set an angle to the second electrode down-leads 130 forming a grid. A plurality of cells 170 are defined by each two adjacent first electrode down-leads 120 and each two adjacent second electrode down-leads 130 of the grid. One of the incandescent light sources 150 is located in each of the cells 170. Each incandescent light source 150 corresponds to a pixel of the incandescent light source display 100.

The substrate 110 is configured for supporting the first electrode down-leads 120, the second electrode down-leads 130, and the incandescent light sources 150. The substrate 110 can be made of flexible materials or rigid materials. The flexible materials may be plastics, resins or fibers. The rigid materials may be ceramics, glasses, or quartzes. When flexible materials are used, the incandescent light source display 100 can be shaped into a desired form. The shape, size, and thickness of the substrate 110 can be chosen according to need. In one embodiment, the substrate 110 is a glass substrate with a thickness of 1 mm (millimeter) and an edge length of 48 mm. The number of the incandescent light source 150 are 16×16 (16 rows, 16 units 220 on each row).

The first electrode down-leads 120 are located equidistantly apart. A distance between adjacent two first electrode down-leads 120 can range from about 50 μm to about 2 cm (centimeters). The second electrode down-leads 130 are located equidistantly apart. A distance between adjacent two second electrode down-leads 130 can range from about 50 μm to about 2 cm. A suitable orientation of the first electrode down-leads 120 and the second electrode down-leads 130 are that they be set at an angle with respect to each other. The angle can range from about 10 degrees to about 90 degrees. In one embodiment, the angle is 90 degrees, and the cell 170 is a square area.

The first electrode down-leads 120 and the second electrode down-leads 130 are made of conductive material such as metal or conductive slurry. In one embodiment, the first electrode down-leads 120 and the second electrode down-leads 130 are formed by applying conductive slurry on the substrate 110 using screen printing process. The conductive slurry composed of metal powder, glass powder, and binder. The metal powder can be silver powder, the glass powder having low melting point, and the binder can be terpineol or ethyl cellulose (EC). The conductive slurry can include about 50% to about 90% (by weight) of the metal powder, about 2% to about 10% (by weight) of the glass powder, and about 8% to about 40% (by weight) of the binder. In one embodiment, each of the first electrode down-leads 120 and the second electrode down-leads 130 is formed with a width in a range from about 30 μm to about 100 μm and with a thickness in a range from about 10 μm to about 50 μm. However, it is noted that dimensions of each of the first electrode down-leads 120 and the second electrode down-leads 130 can vary corresponding to dimension of each cell 170.

Furthermore, the incandescent light source display 100 can include a plurality of insulators 140 sandwiched between the first electrode down-leads 120 and the second electrode down-leads 130 to avoid short-circuiting. The insulators 140 are located at every intersection of the first electrode down-leads 120 and the second electrode down-leads 130 for providing electrical insulation therebetween. In one embodiment, the insulator 140 is a dielectric insulator.

Each of the incandescent light sources 150 can include a first electrode 121, a second electrode 131 and an incandescent element 151. The first electrode 121 is located corresponding to the second electrode 131. The first electrode 121 spaces apart from the second electrode 131. A distance between the first electrode 121 and the second electrode 131 can be in a range from about 10 μm to about 2 cm. The incandescent element 151 is located between the first electrode 121 and the second electrode 131 and electrically connected to the first electrode 121 and the second electrode 131. The incandescent element 151 is spaced from the substrate 110. A distance between the incandescent element 151 and the substrate 110 can be larger than 1 μm. In one embodiment, the distance between the incandescent element 151 and the substrate 110 is 10 μm.

The first electrodes 121 of the incandescent light sources 150 arranged in a row of the cells 170 can be electrically connected to the first electrode down-lead 120. The second electrodes 131 of the incandescent light sources 150 arranged in a column of the cells 170 can be electrically connected to the second electrode down-lead 130.

Each of the first electrodes 121 can have a length in a range from about 20 μm to about 15 mm, a width in a range from about 30 μm to 10 mm and a thickness in a range from about 10 μm to about 500 μm. Each of the second electrodes 131 has a length in a range from about 20 μm to about 15 mm, a width in a range from about 30 μm to about 10 mm and a thickness in a range from about 10 μm to about 500 μm. In one embodiment, the first electrode 121 has a length in a range from about 100 μm to about 700 μm, a width in a range from about 50 μm to about 500 μm and a thickness in a range from about 20 μm to about 100 μm. The second electrode 131 has a length in a range from about 100 μm to about 700 μm, a width in a range from about 50 μm to about 500 μm and a thickness in a range from about 20 μm to about 100 μm.

The first electrodes 121 and the second electrode 131 can be made of metal or conductive slurry. In one embodiment, the first electrode 121 and the second electrode 131 are formed by screen printing the conductive slurry on the substrate 110. As mentioned above, the conductive slurry forming the first electrode 121 and the second electrode 131 is the same as the electrode down-leads 120, 130.

The heat capacity per unit area of the incandescent element 151 can be less than $2 \times 10^{-4}$ J/m$^2$*K. The incandescent element 151 includes a carbon nanotube structure. The carbon nanotube structure includes a plurality of carbon nanotubes distributed therein, and the carbon nanotubes therein can be combined by van der Waals attractive force therebetween. The carbon nanotube structure can be a substantially pure structure of the carbon nanotubes, with few impurities. The carbon nanotubes can be used to form many different structures and provide a large specific surface area. The heat capacity per unit area of the carbon nanotube structure is less than $1.7 \times 10^{-6}$ J/m$^2$*K. As the heat capacity of the carbon nanotube structure is very low, and the temperature of the incandescent element 151 can rise and fall quickly, which makes the incandescent element 151 have a high incandescent response speed. Further, the carbon nanotubes have a low density, about 1.35 g/cm$^3$, so the incandescent element 151 is light. As the carbon nanotube has large specific surface area, the carbon nanotube structure with a plurality of carbon nanotubes has large specific surface area. Since the specific surface of the carbon nanotube structure is large enough, the carbon nanotube structure is adhesive and can be directly applied to a surface of an object.

The carbon nanotubes in the carbon nanotube structure can be arranged orderly or disorderly. The term 'disordered carbon nanotube structure' refers to a structure where the carbon nanotubes are arranged along many different directions, and the aligning directions of the carbon nanotubes are random. The number of the carbon nanotubes arranged along each different direction can be almost the same (e.g. uniformly disordered). The disordered carbon nanotube structure can be isotropic. The carbon nanotubes in the disordered carbon nanotube structure can be entangled with each other.

The carbon nanotube structure including ordered carbon nanotubes is an ordered carbon nanotube structure. The term 'ordered carbon nanotube structure' refers to a structure where the carbon nanotubes are arranged in a consistent systematic manner, e.g., the carbon nanotubes are arranged approximately along a same direction and/or have two or more sections within each of which the carbon nanotubes are arranged approximately along a same direction (different sections can have different directions). The carbon nanotubes in the carbon nanotube structure can be single-walled, double-walled, or multi-walled carbon nanotubes.

The carbon nanotube structure can be a carbon nanotube film structure with a thickness ranging from about 0.5 nm (nanometer) to about 1 mm. The carbon nanotube film structure can include at least one carbon nanotube film. The carbon nanotube structure can also be a linear carbon nanotube structure with a diameter ranging from about 0.5 nm to about 1 mm. The carbon nanotube structure can also be a combination of the carbon nanotube film structure and the linear carbon nanotube structure. It is understood that any carbon nanotube structure described can be used with all embodiments. It is also understood that any carbon nanotube structure may or may not employ the use of a support structure.

Figure 4:
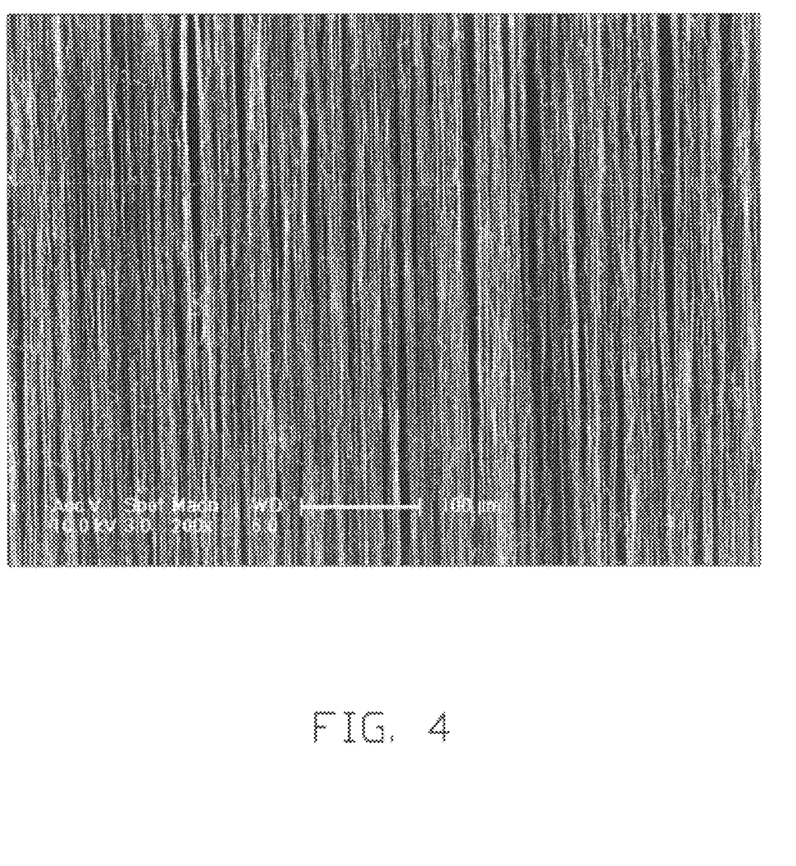
FIG. 4 is a Scanning Electron Microscope (SEM) image of a drawn carbon nanotube film.

In one embodiment, the carbon nanotube film structure includes at least one drawn carbon nanotube film. A film can be drawn from a carbon nanotube array, to form a drawn carbon nanotube film. The drawn carbon nanotube film includes a plurality of successive and oriented carbon nanotubes joined end-to-end by van der Waals attractive force therebetween. The drawn carbon nanotube film is a free-standing film. Referring to FIG. 4, each drawn carbon nanotube film includes a plurality of successively oriented carbon nanotube segments joined end-to-end by van der Waals attractive force therebetween. Each carbon nanotube segment includes a plurality of carbon nanotubes parallel to each other, and combined by van der Waals attractive force therebetween. As can be seen in FIG. 4, some variations can occur in the drawn carbon nanotube film. The carbon nanotubes in the drawn carbon nanotube film are oriented along a preferred orientation. The carbon nanotube film can be treated with an organic solvent to increase the mechanical strength and toughness of the carbon nanotube film and reduce the coefficient of friction of the carbon nanotube film. A thickness of the drawn carbon nanotube film can range from about 0.5 nm to about 100 μm. The density of the drawn carbon nanotube film can be less than $3 \times 10^{-4}$ kg/m$^3$.

Figure 5:
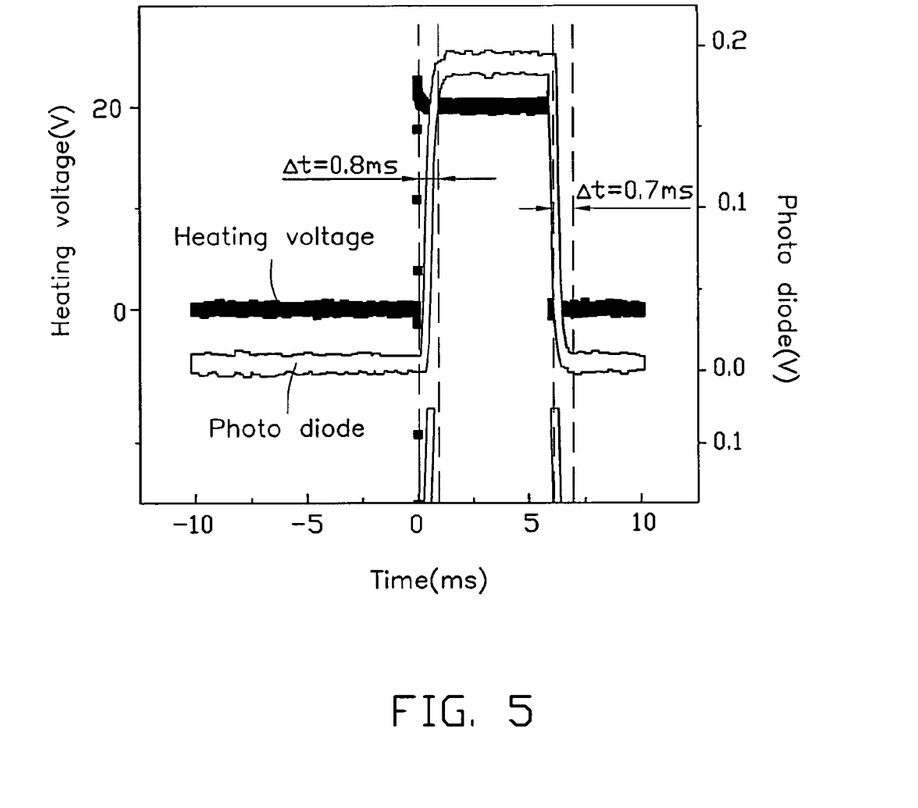
FIG. 5 is an SEM image from top of an incandescent light source of the incandescent light source display of one embodiment.

The response speed of the drawn carbon nanotube film is very high because of the very low heat capacity per unit area, the large surface area, and the large radiation coefficient. The high response speed makes the classical phenomena of incandescence light emission applicable in information display. Referring to FIG. 5, an incandescence response to heating pulses of the drawn carbon nanotube film with a length of 8 mm and a width of 2 mm is shown, when the drawn carbon nanotube film is heated by a 103 mA (milliamperes) current pulse of 6 ms (milliseconds) width. As shown in FIG. 5, the ramp up and cooling down time are about 0.8 ms and 0.7 ms, respectively. Here the ramp up time is the time from 90% of the maximum of the heating voltage to 90% of the maximum of the photo diode signal. The cooling down time is the time from stopping heating voltage to a value of the photo diode signal which is slightly larger than its minimum (two times the standard deviation of the minimum larger than the minimum itself). The incandescence response time of the drawn carbon nanotube film is shorter than that of an LCD. The ramp up and cooling down time depends on the heat capacity per unit area of the carbon nanotube structure. The ramp up and cooling down time is larger than 40 ms when the heat capacity per unit area of the carbon nanotube structure is $2 \times 10^{-4}$ J/m$^2$*K.

The carbon nanotube film structure of the incandescent element 151 can include at least two stacked drawn carbon nanotube films. In other embodiments, the carbon nanotube structure can include two or more coplanar carbon nanotube films, and can include layers of coplanar carbon nanotube films. Additionally, when the carbon nanotubes in the carbon nanotube film are aligned along one preferred orientation (e.g., the drawn carbon nanotube film), an angle can exist between the orientation of carbon nanotubes in adjacent films, whether stacked or adjacent. Adjacent carbon nanotube films can be combined by only the van der Waals attractive force therebetween. The number of the layers of the carbon nanotube films is not limited. However the thicker the carbon nanotube structure, the specific surface area will decrease. An angle between the aligned directions of the carbon nanotubes in two adjacent carbon nanotube films can range from about 0° to about 90°. When the angle between the aligned directions of the carbon nanotubes in adjacent carbon nanotube films is larger than 0 degrees, a microporous structure is defined by the carbon nanotubes in the incandescent element 151. The carbon nanotube structure in an embodiment employing these films will have a plurality of micropores. Stacking the carbon nanotube films will also add to the structural integrity of the carbon nanotube structure. In some embodiments, the carbon nanotube structure has a free standing structure.

In another embodiment, the carbon nanotube film structure includes a flocculated carbon nanotube film. The flocculated carbon nanotube film can include a plurality of long, curved, disordered carbon nanotubes entangled with each other. Further, the flocculated carbon nanotube film can be isotropic. The carbon nanotubes can be substantially uniformly dispersed in the carbon nanotube film. Adjacent carbon nanotubes are acted upon by van der Waals attractive force to form an entangled structure with micropores defined therein. It is understood that the flocculated carbon nanotube film is very porous. Sizes of the micropores can be less than 10 micrometers. The porous nature of the flocculated carbon nanotube film will increase specific surface area of the carbon nanotube structure. Further, due to the carbon nanotubes in the carbon nanotube structure being entangled with each other, the carbon nanotube structure employing the flocculated carbon nanotube film has excellent durability, and can be fashioned into desired shapes with a low risk to the integrity of the carbon nanotube structure. The thickness of the flocculated carbon nanotube film can range from about 0.5 nm to about 1 mm.

In another embodiment, the carbon nanotube film structure can include at least a pressed carbon nanotube film. The pressed carbon nanotube film can be a free-standing carbon nanotube film. The carbon nanotubes in the pressed carbon nanotube film are arranged along a same direction or arranged along different directions. The carbon nanotubes in the pressed carbon nanotube film can rest upon each other. Adjacent carbon nanotubes are attracted to each other and combined by van der Waals attractive force. An angle between a primary alignment direction of the carbon nanotubes and a surface of the pressed carbon nanotube film is 0 degrees to approximately 15 degrees. The greater the pressure applied, the smaller the angle formed. When the carbon nanotubes in the pressed carbon nanotube film are arranged along different directions, the carbon nanotube structure can be isotropic. The thickness of the pressed carbon nanotube film ranges from about 0.5 nm to about 1 mm.

In other embodiments, the carbon nanotube structure can include linear carbon nanotube structures. Linear carbon nanotube structures include carbon nanotube wires and/or carbon nanotube cables.

The carbon nanotube wire can be untwisted or twisted. Treating the drawn carbon nanotube film with a volatile organic solvent can form the untwisted carbon nanotube wire. In one embodiment, the organic solvent is applied to soak the entire surface of the drawn carbon nanotube film. During the soaking, adjacent parallel carbon nanotubes in the drawn carbon nanotube film will bundle together, due to the surface tension of the organic solvent as it volatilizes, and thus, the drawn carbon nanotube film will be shrunk into untwisted carbon nanotube wire. The untwisted carbon nanotube wire includes a plurality of carbon nanotubes substantially oriented along a same direction (i.e., a direction along the length of the untwisted carbon nanotube wire). The carbon nanotubes are parallel to the axis of the untwisted carbon nanotube wire. In one embodiment, the untwisted carbon nanotube wire includes a plurality of successive carbon nanotube segments joined end to end by van der Waals attractive force therebetween. Each carbon nanotube segment includes a plurality of carbon nanotubes substantially parallel to each other, and combined by van der Waals attractive force therebetween. The carbon nanotube segments can vary in width, thickness, uniformity and shape. Length of the untwisted carbon nanotube wire can be arbitrarily set as desired. A diameter of the untwisted carbon nanotube wire ranges from about 0.5 nm to about 100 μm.

The twisted carbon nanotube wire can be formed by twisting a drawn carbon nanotube film using a mechanical force to turn the two ends of the drawn carbon nanotube film in opposite directions. The twisted carbon nanotube wire includes a plurality of carbon nanotubes helically oriented around an axial direction of the twisted carbon nanotube wire. In one embodiment, the twisted carbon nanotube wire includes a plurality of successive carbon nanotube segments joined end to end by van der Waals attractive force therebetween. Each carbon nanotube segment includes a plurality of carbon nanotubes parallel to each other, and combined by van der Waals attractive force therebetween. Length of the carbon nanotube wire can be set as desired. A diameter of the twisted carbon nanotube wire can be from about 0.5 nm to about 100 μm. Further, the twisted carbon nanotube wire can be treated with a volatile organic solvent after being twisted. After being soaked by the organic solvent, the adjacent paralleled carbon nanotubes in the twisted carbon nanotube wire will bundle together, due to the surface tension of the organic solvent when the organic solvent volatilizing. The specific surface area of the twisted carbon nanotube wire will decrease, while the density and strength of the twisted carbon nanotube wire will be increased.

A carbon nanotube cable includes two or more carbon nanotube wires. The carbon nanotube wires in the carbon nanotube cable can be twisted and/or untwisted. In an untwisted carbon nanotube cable, the carbon nanotube wires are parallel with each other. In a twisted carbon nanotube cable, the carbon nanotube wires are twisted with each other.

The incandescent element 151 can include one or more linear carbon nanotube structures. The plurality of linear carbon nanotube structures can be paralleled with each other, cross with each other, weaved together, or twisted with each other. The resulting structure can be an over all planar structure if so desired.

In other embodiments, the carbon nanotube structure can include other materials and thus be a carbon nanotube composite. The carbon nanotube composite can include a carbon nanotube structure and other materials dispersed therein. The other materials can be distributed in the micropores of the carbon nanotube structure or on surface of the carbon nanotubes in the carbon nanotube structure. The other materials can be platinum, tungsten, aurum, or combinations thereof.

Furthermore, the incandescent light source display 100 can include a fixing element 160 located on the first electrode 121 and the second electrode 131. The fixing element 160 is configured to fix the incandescent element 151 on the first electrode 121 and the second electrode 131. In one embodiment, the material, shape, and size of the fixing element 160 is the same as the second electrode 131.

Furthermore, a container 180 can be included in the incandescent light source display 100 to accommodate the substrate 110, the electrode down-leads 120, 130, the electrodes 121, 131, and the incandescent elements 151. The container 180 can be a vacuum box or a box filled with inert gas. The container 180 can be formed using vacuum seal technology. In one embodiment, the incandescent light source display 100 is sealed in a planar vacuum glass box with pipe-free evacuation technology.

In use, a driving circuit (not shown) is designed to drive the incandescent light source display 100. The incandescent light source display 100 can be controlled by the driving circuit to display a dynamic image. Because the light-on voltage of the carbon nanotube structure incandescence matrix is about 4V (voltage) to 7V, it is very compatible with integrated circuit (IC) technology. The display logic is by row selector and column scan. Because the carbon nanotube film is bi-directionally conductive, diodes can be used to cut off the reverse current.

Figure 6:
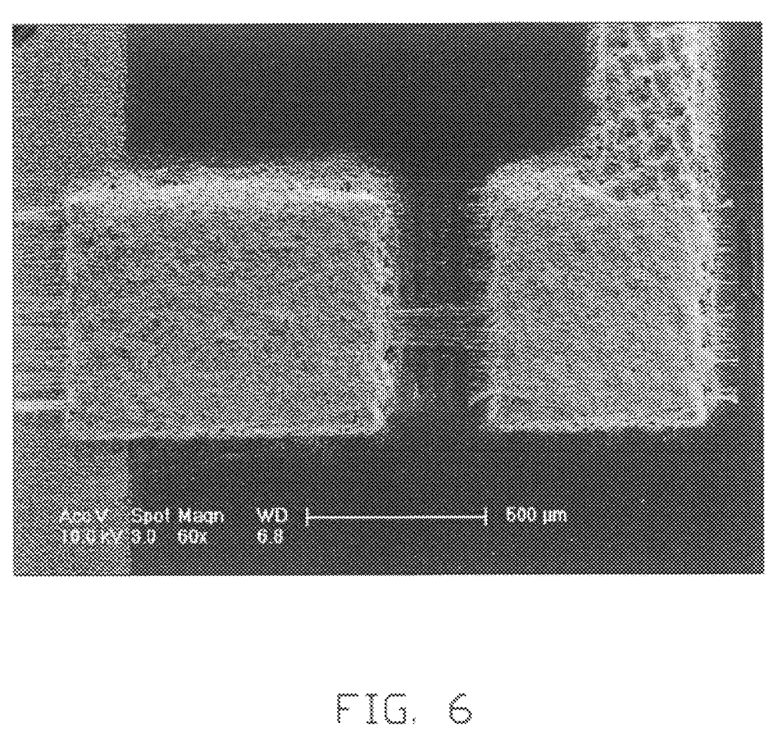
FIG. 6 is an SEM image from side of an incandescent light source of the incandescent light source display of one embodiment.
Figure 7:
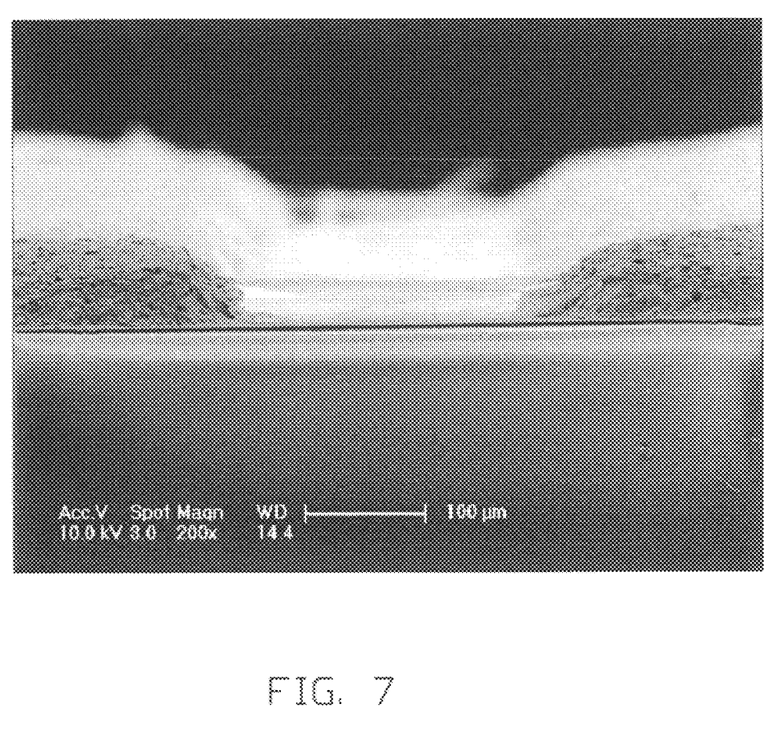
FIG. 7 is an incandescence response to heating pulse of the drawn carbon nanotube film.

In testing one embodiment, the incandescent light source display 100 has a 16×16 carbon nanotube film pixels matrix and works in a box filled with inert gas. Referring to FIGS. 6 and 7, the incandescent element 151 is a drawn carbon nanotube film with a length of 300 μm, a width of 100 μm and a thickness in a range from about 1 nm to about 100 nm. The carbon nanotubes of the incandescent element 151 extending from the first electrode 121 to the second electrode 131. The drawn carbon nanotube film can be attached to a surface of the electrode 121, 131 with an adhesive, by a mechanical force, by the adhesive properties of the carbon nanotube film or by a combination thereof.

Figure 8:
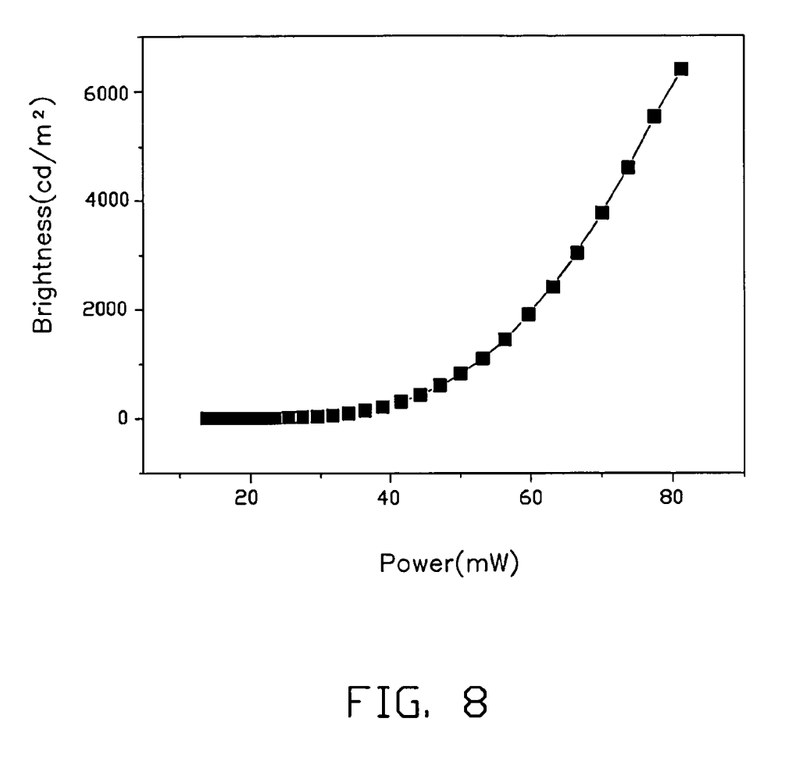
FIG. 8 shows a relationship between brightness and power of the incandescent light source display of one embodiment.
Figure 9:
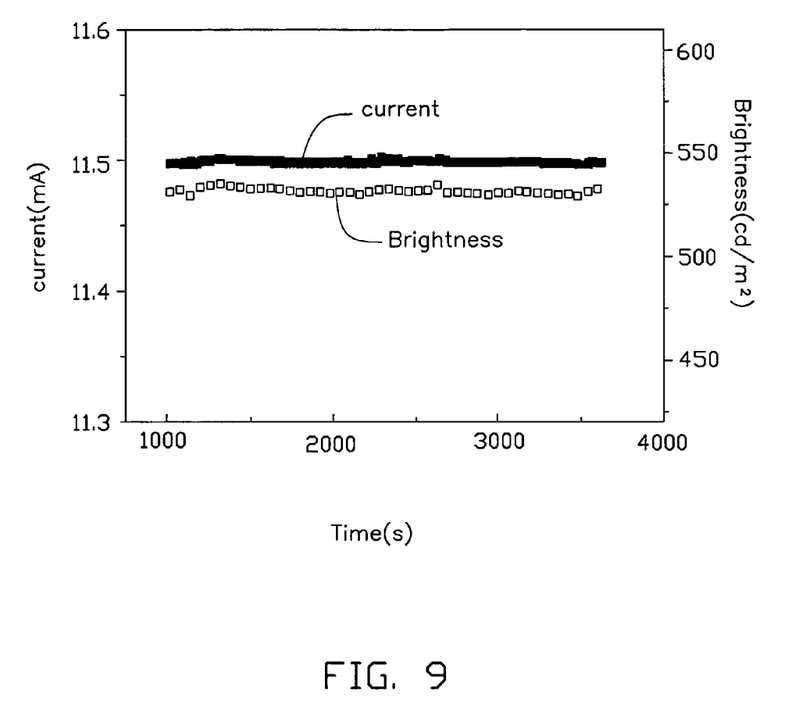
FIG. 9 shows current and incandescence brightness stably of the incandescent light source display of one embodiment.

FIG. 8 shows the brightness of an individual drawn carbon nanotube film pixel according to one embodiment at different heating powers. The incandescent element 151 is a drawn carbon nanotube film with a length of 300 μM, a width of 100 μm and a thickness in a range from about 1 nm to about 100 nm. The brightness of the sample increases exponentially with increases in the heating power. The maximum brightness of the individual drawn carbon nanotube film pixel reaches 6400 cd/m$^2$ (candela per square meter) at about 0.08 W (watt) heating power. The total power of the incandescent light source display 100 with 16×16 pixels matrix is about 1 W. FIG. 9 shows the current and incandescence birghtness stabilities of the tested drawn carbon nanotube film pixel. The brightness of an individual drawn carbon nanotube film pixel is about 530 cd/m$^2$ when the current is 11.5 mA. The temperature of the drawn carbon nanotube film pixel is about 1740K when the current is 11.5 mA. Current and incandescence brightness stabilities of the drawn carbon nanotube film pixel are 0.05% and 1.1%, respectively as show in FIG. 8. The brightness stability is slightly worse than the current due to the exponential relations shown in FIG. 8. The incandescence light uniformity for the 16×16 pixels is satisfactory. The driving voltage of the drawn carbon nanotube film pixel can be about 1V due to the low power and driving current of the drawn carbon nanotube film pixel.

The incandescent light source display 100 allows the incandescent light to be applied in the dynamically display because of the high incandescent response speed of the carbon nanotube structure. The incandescent light source display 100 using carbon nanotube structure consumes low amounts of power, has high brightness and low driving current. The incandescent light source display 100 using carbon nanotube structure need does not require a fluorescence layer and has simple structure. The viewing angle of the incandescent light source display 100 using carbon nanotube structure does not have the view angle problem of LCDs, because the incandescence light of the carbon nanotube structure is almost completely non-polarized. The incandescent light source display 100 using carbon nanotube structure can be applied in large screen and high resolution display.

A method for making the incandescent light source display 100 according to one embodiment includes:

(a) providing a substrate;

(b) applying a plurality of first electrode down-leads parallel to each other on the substrate;

(c) applying a plurality of second electrode down-leads parallel to each other on the substrate, the second electrode down-leads and the first electrode down-leads are crossed and insulated from each other to form a grid, and each two adjacent first electrode down-leads and each two adjacent second electrode down-leads define a cell;

(d) applying a first electrode and a second electrode on each cell;

(e) providing a carbon nanotube structure and covering the carbon nanotube structure on the substrate, the carbon nanotube structure is electrically connected to the first electrode and the second electrode; and (f) cutting the carbon nanotube structure between adjacent two cells to form an independent carbon nanotube structure on each rectangular area.

In steps (b), (c) and (d), the electrode down-leads and the electrodes can be formed by screen printing process, sputtering, or thermal evaporation. The first electrode down-leads and the second electrode down-leads are crossed with each other to form an addressing circuit. The first electrode down-leads and the first electrodes can be formed together. The second electrode down-leads and the second electrodes can be formed together. In one embodiment, the electrode down-leads and the electrodes are formed by applying conductive slurry on the substrate using screen printing process.

Furthermore, a step (g) can be carried out before the step (b). The insulators can be formed by screen printing or coating.

In step (e), in one embodiment, the carbon nanotube structure is a drawn carbon nanotube film. The drawn carbon nanotube film can be covered on the substrate directly with the carbon nanotube oriented from the first electrode to the second electrode. The drawn carbon nanotube film can be attached to a surface of the first electrodes and the second electrodes with an adhesive, by a mechanical force, by the adhesive properties of the drawn carbon nanotube film or by a combination thereof.

Furthermore, a step (h) of forming a fixing element on the first electrode and the second electrode to fix the carbon nanotube structure thereon can be carried out after the step (e). The fixing element can be formed by screen printing or coating.

In step (e), the carbon nanotube structure can be cut by a laser ablation process, electron beam scanning process, or thermal melting process. In one embodiment, laser ablation is employed to break down the carbon nanotube structure. The laser beam can be utilized to scan and irradiate the carbon nanotube structure along a direction substantially parallel to the arrangement directions of the first electrode down-leads and the second electrode down-lead or across the arrangement directions of the first electrode down-leads and the second electrode down-lead. Thus, one portion of the carbon nanotube structure is removed and the other portion of the carbon nanotube structure between the first electrodes and the second electrode is retained.

Although the present incandescent light source display is only single color, it is possible to realize a color display in a mode such as thermionic emission display after further coating low work function materials on the carbon nanotube structure. Compared with the fabrication with light emission diode (LED) display, the fabrication process of the incandescent light source display using carbon nanotube structure incandescence display is simple, consumes less energy, and produces less industrial waste.

Depending on the embodiment, certain of the steps described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. An apparatus, the apparatus comprising an incandescent light source display, the incandescent light source display comprises of:
    a substrate;
    a plurality of parallel first electrode down-leads located on the substrate;
    a plurality of parallel second electrode down-leads located on the substrate, the first electrode down-leads set an angle to the second electrode down-leads defining a grid, and each two adjacent first electrode down-leads and each two adjacent second electrode down-leads of the grid defines a plurality of cells; and
    a plurality of incandescent light sources, each of the incandescent light sources is located in each of the cells, and each of the incandescent light sources comprises a first electrode, a second electrode and an incandescent element, wherein the incandescent element comprises a carbon nanotube structure with a heat capacity per unit area less than $2 \times 10^{-4}$ J/m$^2$*K.

2. The incandescent light source display of claim 1, wherein the carbon nanotube structure comprises a carbon nanotube film structure, a linear carbon nanotube structure or combinations thereof.

3. The incandescent light source display of claim 2, wherein the carbon nanotube film structure comprises a plurality of carbon nanotubes substantially oriented along a same direction and extended from the first electrode to the second electrode.

4. The incandescent light source display of claim 3, wherein the carbon nanotubes of the carbon nanotube film structure are joined end-to-end by Van der Waals attractive force therebetween.

5. The incandescent light source display of claim 2, wherein the carbon nanotube film structure comprises a plurality of carbon nanotubes entangled with each other.

6. The incandescent light source display of claim 2, wherein the carbon nanotube film structure comprises a plurality of carbon nanotubes resting upon each other, an angle exist between an alignment direction of the carbon nanotubes and a surface of the heating element, and the angle ranges from about 0 degrees to about 15 degrees.

7. The incandescent light source display of claim 2, wherein the linear carbon nanotube structure comprises at least one untwisted carbon nanotube wire, at least one twisted carbon nanotube wire or combinations thereof.

8. The incandescent light source display of claim 7, wherein the twisted carbon nanotube wire comprises a plurality of carbon nanotubes helically oriented around an axis of the twisted carbon nanotube wire.

9. The incandescent light source display of claim 2, wherein the linear carbon nanotube structure comprises at least one untwisted carbon nanotube wire comprising a plurality of carbon nanotubes substantially oriented along a direction of an axis of the untwisted carbon nanotube wire.

10. The incandescent light source display of claim 1, wherein the heat capacity per unit area of the carbon nanotube structure is less than $1.7 \times 10^{-6}$ J/m$^2$*K.

11. The incandescent light source display of claim 1, wherein the incandescent element is a carbon nanotube composite structure.

12. The incandescent light source display of claim 1, wherein the incandescent element is spaced apart from the substrate.

13. The incandescent light source display of claim 1, wherein the carbon nanotube structure is located on a surface of the first electrode or the second electrode.

14. The incandescent light source display of claim 13, wherein the carbon nanotube structure is attached to the first electrode or the second electrode with an adhesive, by a mechanical force or by an adhesive property of the carbon nanotube structure.

15. The incandescent light source display of claim 13, further comprising a plurality of fixing elements located on the first electrode and the second electrode to fix the carbon nanotube structure thereon.

16. The incandescent light source display of claim 1, wherein an angle between the first electrode down-leads and the second electrode down-leads is about 90 degrees.

17. The incandescent light source display of claim 1, further comprising a container, the substrate, the first electrode down-leads, the second electrode down-leads and the incandescent light sources are accommodated in the container.

18. The incandescent light source display of claim 17, wherein the container is under a vacuum or filled with inert gas.

* * * * *